Dec. 3, 1946.  V. L. TANNEHILL  2,412,107
LIQUID SUPPLY SYSTEM
Filed Nov. 20, 1944
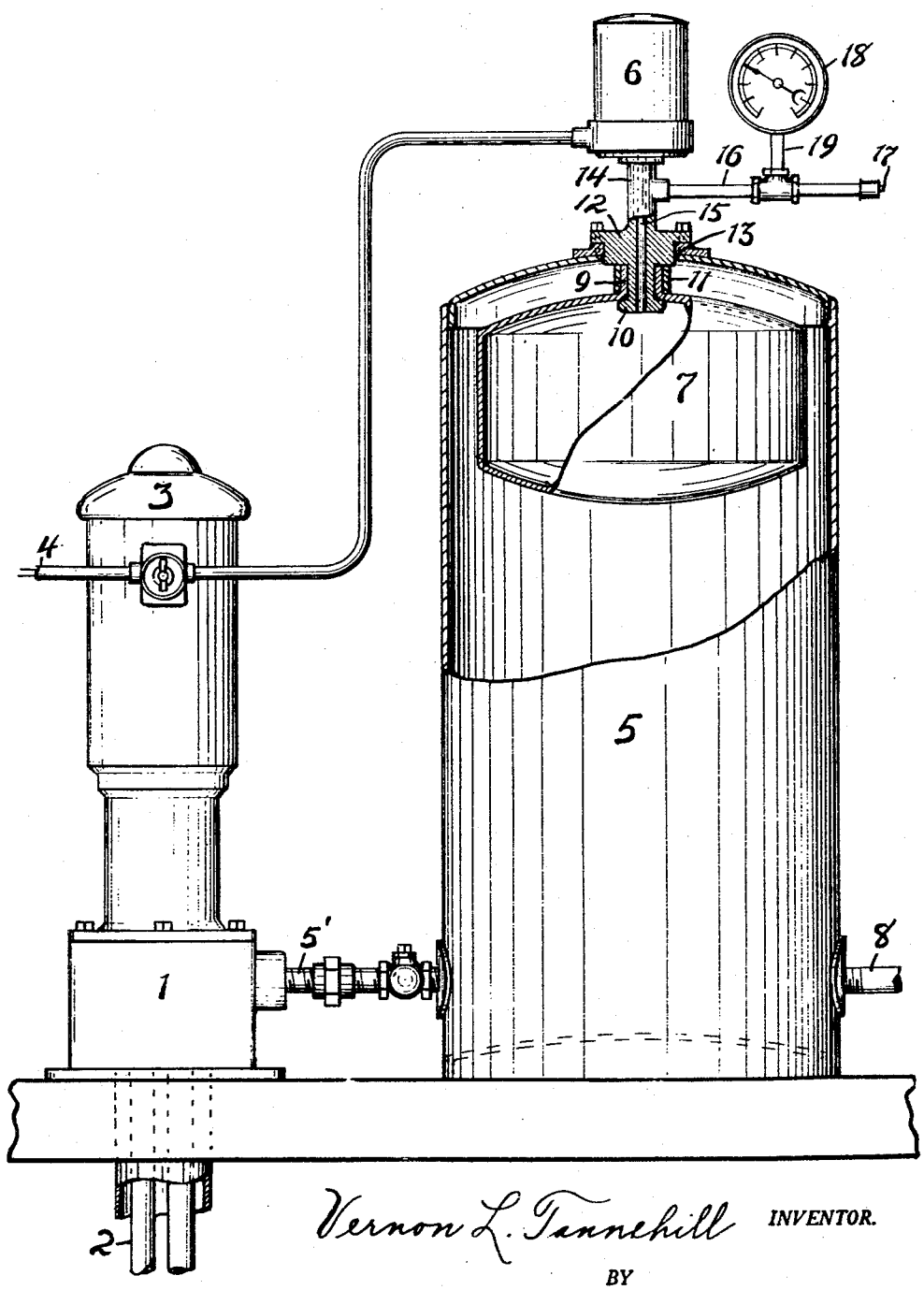
Vernon L. Tannehill INVENTOR.
BY Patented Dec. 3, 1946

2,412,107

UNITED STATES PATENT OFFICE 2,412,107

LIQUID SUPPLY SYSTEM

Vernon L. Tannehill, Fort Wayne, Ind.

Application November 20, 1944, Serial No. 564,385

8 Claims. (Cl. 103—25)

This invention relates to liquid supply systems of that general type in which an automatically regulated electrical motor-driven pump is employed in conjunction with a pressure tank in which a quantity of liquid from a source of supply is forced by the pump under restraint of entrapped air in the tank, so the liquid accumulated in the tank is sustained under air pressure in readiness for instant use upon being liberated through a service pipe.

Heretofore, in the operation of such apparatus, the presure tank initially is full of air which is compressed when liquid is forced into the tank, the pressure of air being raised directly as the quantity of liquid accumulated in the tank increases. It has been found that more or less air becomes entrained with the liquid during its passage out through the service pipe and thus escapes from the body of entrapped air in the pressure tank resulting eventually in complete depletion of an essential quantity of compressed air within the tank. The system thus becomes water-logged.

Generally, the energizing circuit for the pump motor is controlled by a commonly known regulator switch, which operates automatically as influenced by pressure in the liquid circulating system, with which the regulator is connected. In the operation of such apparatus the regulator switch automatically is opened when the pressure in the system reaches a predetermined maximum high point, causing the pumping operation to cease, and subsequently, when the pressure in the system is lowered to a predetermined minimum point, due to withdrawal of liquid from the service pipe, the switch is closed resulting in resumption of the pumping operation and refilling of the pressure tank. By this arrangement, operation of the pump is periodic and occurs upon partial depletion of the body of liquid accumulated in the pressure tank. Thus, the tank is automatically recharged with a fresh supply of liquid, stored under air pressure, in readiness for instant delivery through the service pipe upon opening of an outlet therefor. However, when the body of compressed air entrapped in the liquid distributing system is substantially exhausted, the system becomes water-logged, whereupon the automatic action of the regulating switch becomes erratic which causes starting of the pumping operation upon each slight withdrawal of liquid from the service pipe, and immediate restarting of the pumping operation upon closing of the outlet of the service pipe. To avoid such intolerable conditions there have been devised numerous ways of replenishing the entrapped air in the pressure tank so as to insure proper functioning of the system.

An object of the instant invention is to provide means, in a liquid distributing system of the type above identified, to circumvent escape or depletion of a definite predetermined quantity of entrapped air within the pressure tank, wherefore to perpetuate operation of the system at its maximum efficiency.

Another object of the invention is to afford, in an air-pressure liquid-distributing system, means by which is permanently maintained within the pressure tank of the system a segregated selected quantity of air susceptible to compression and expansion as fluid is supplied to and withdrawn from the system.

And a further object of the invention is to maintain an air pressure fluid distributing system in proper operable condition without requirement of replenishment of its essential air entrapped therein, or of periodic drainage of the pressure tank usually necessitated because of water-logging of the system.

Other objects and advantages of the invention appear in the following description.

An illustrative embodiment of the invention is shown in the accompanying drawing which is a front elevational view, partly cut away, of a structure in which the invention is incorporated.

The illustrative embodiment of the invention consists of a water distributing system in which is included, a pump 1 having a suction pipe connection 2 with any suitable source of liquid supply, and which is provided with an electric motor 3, an energizing electric circuit 4 therefor, an air pressure tank 5 connected at its lower end portion with the pump discharge pipe 5', an ordinary pressure actuated controller switch 6 connected in the energizing circuit, and an elastic collapsible pouch 7 connected hermetically with the air-pressure actuated controller switch.

The motor-driven pump and the expansion tank are of any well known construction, connected together and arranged so that fluid is supplied to the tank from the pump and discharged from the tank through a distributing pipe 8 connected with the lower end portion thereof. By this means is accumulated a reserve quantity of liquid and compressed air within the tank, so that the stored liquid may be withdrawn upon opening of an outlet in the distributing pipe, such as a faucet (not shown), the outflow of liquid through the distributing pipe being urged by pressure of the entrapped air in the tank.

The elastic compressible pouch 7 has a neck 9 that is tightly secured about a nipple 10 that extends into the top of the tank, there being provided a clasp 11 that encompasses the neck and tightly constricts it about the nipple to effect an hermetical seal. The nipple depends from a bung fixture 12 that surmounts the tank and closes the opening 13 therein, and preferably has an upright post 14 on which is mounted the controller switch 6, there being a duct 15 extending through the nipple and post affording air communication between the pouch and the operating mechanism for the switch.

Means are provided by which to inflate or deflate the pouch, which consists conveniently of a pipe 16 connected with the post 14 and has communication with the duct 15 therein, and its opposite end is provided with an air inlet check valve 17, such as is ordinarily provided on the valve stem of a pneumatic tire. Thus, air may be supplied through the valve under pressure from a suitable source to the pouch, or released therefrom as desired.

Preferably, a pressure gauge 18 of any suitable type is connected by means of a supporting tube 19 with the air pipe 16, wherefore to ascertain the degree of air pressure initially introduced to inflate the pouch, and any subsequent internal variations of pressure that occur during the passage of fluid into and from the tank.

The particular relative arrangement of the pressure tank, air pouch controller switch, and pressure gauge, in the illustrative embodiment of the invention, is exemplary, but not entirely essential to full functioning of the system. For instance, the air pouch 7 may be positioned within the air pressure tank without support by the nipple or connected relation with the controller switch. As an alternative, the air pouch may be inflated to a desired extent and its neck closed so the pouch itself is hermetically sealed and left at random within the tank. By this arrangement air communication between the tank, controller switch and gauge is established therebetween entirely independent with respect to the air pouch. The purpose of the invention in this arrangement is realized by the establishment within the pressure tank of a permanently segregated compressible and expansible body of air by which is constantly maintained within the pressure tank an essential reserve capacity of air, wherefore is thwarted water-logging of the pressure tank and the system. With the parts thus arranged, the inflated air pouch is compressed more or less accordingly as the pressure within the tank varies, while its initial content of air is segregated entirely from the transient fluid in which the pouch is enveloped, so that saturation by or entrainment with the segregated fugitive transient fluid that passes into and from the tank is circumvented. Thus, proper functioning of the expansible and compressible air body within the pouch is maintained.

Operation

In operation, the air pouch is initially inflated by introducing air under pressure by any suitable means through the check valve 17 so there is permanently established within the pressure tank 5 a predetermined quantity of air segregated by the pouch from its envelopment of transient fluid that passes into and from the tank.

The air pressure within the pouch initially is such as to permit closing of the energizing circuit by the controller switch, thus to cause starting of the pumping operation and continuance thereof with consequent flow of fluid into the tank, corresponding rise of pressure therein, and compression of the pouch and its contained air to a predetermined maximum point which causes the controller switch automatically to open, thus terminating temporarily the pumping operation. When the accumulated fluid within the tank is withdrawn therefrom through the distributing pipe, the consequent reduced air pressure within the tank permits expansion of the segregated air within the pouch and consequent closing of the energizing circuit by the controller switch, thus reestablishing the pumping operation and recharging of the pressure tank. These operations continue periodically with more or less regularity accordingly as the fluid from the pressure tank is withdrawn through the distributing pipe.

An outstanding feature of the invention is that a substantial body of entrapped air is maintained constantly, enveloped by and responsive to variations of pressure of the transient fugitive fluid in the system while segregated therefrom, wherefore to obviate water-logging and perpetuate continuity in the operation of the apparatus under its best operating conditions.

Variations from the particular construction above disclosed may be resorted to by the exercise of skill in the art, without departure from the scope of the invention, and the following claims are intended to be inclusive of such variations.

What I claim is:

1. An air pressure liquid distributing system in which are included an air pressure tank, a motor-driven pump connected with said tank for supplying liquid thereto, an air pressure operated controller for the pump motor, an elastic inflated compressible pouch, disposed within the tank, having an air communicating connection with the controller and hermetically sealed with respect to said tank, a connection between the controller and the pump motor, a valve-controlled means through which to inflate said pouch, and a pressure gauge in connection with said means to indicate the degree of air pressure within said pouch.

2. An air pressure liquid distributing system in which are included an air pressure tank, a motor-driven pump connected with said tank for supplying liquid thereto, an air pressure operated controller for the pump motor, an inflated elastic compressible pouch, disposed within the tank, having an air communicating connection with the controller and hermetically sealed with respect to said tank, and a connection between the controller and the pump motor.

3. In an air pressure liquid distributing system having an air pressure tank provided with a distributing pipe outlet and means for supplying liquid to said tank, an air pressure-operated controller operatively connected with said means, and an inflated elastic air pouch disposed within said tank encompassed by fluid entrapped therein, and having an air communicating connection with said controller whereby the controller is actuated according to the air pressure within the pouch.

4. In an air pressure liquid distributing system in which is included an air pressure tank provided with means for supplying fluid thereto under pressure and having a distributing pipe outlet, a pneumatically operated controller for said means, and an inflated air pouch enveloped by said fluid, hermetically sealed relative thereto and having operative connection with said control, the arrangement being such that the pouch is compressed or expanded as the pressure of the enveloping fluid varies thus causing operation of the controller accordingly.

5. In an air pressure liquid distributing system in which is included an air pressure tank provided with means for supplying fluid thereto under pressure and having a distributing pipe outlet, a pneumatically operated controller for said means, having air communication with said pressure tank, whereby the controller is operated automatically by variations of pressure of the air in said tank, an inflated air pouch located within said tank enveloped by the fluid therein and hermetically sealed relative thereto, thus to prevent the air in the pouch from entrainment with the fluid during withdrawal thereof from the tank.

6. In an air pressure fluid distributing system in which is included a tank which entraps air under pressure, an inflated air pouch disposed within said tank enveloped by the fluid therein and hermetically sealed relative thereto, the arrangement being such that a definite quantity of air is segregated from the enveloping fluid and constantly maintained within said tank.

7. An air pressure fluid dispensing system having a member which entraps air therein, said member having in connection therewith means for supplying fluid thereto under pressure and a discharge outlet, and an elastic pouch disposed within said member in which is contained permanently a definite quantity of air under pressure susceptible to contraction and expansion correspondingly with variations of fluid pressure within said member.

8. An air pressure fluid dispensing system having a member which entraps air therein, said member having in connection therewith means for supplying fluid thereto under pressure and a discharge outlet, and an expansible and contractible means enveloped by the fluid entrapped in said member in which is contained permanently a body of air under pressure segregated by said means from the enveloping fluid.

VERNON L. TANNEHILL.